US012636634B2

(12) United States Patent
Eddaoudi et al.

(10) Patent No.: US 12,636,634 B2
(45) Date of Patent: May 26, 2026

(54) FLUORINATED MOF MATERIALS HAVING RECTANGULAR CHANNELS, METHOD OF SYNTHESIZING MOF MATERIALS AND METHODS OF USING MOF MATERIALS INCLUDING FOR CO₂ CAPTURE

(71) Applicants: King Abdullah University of Science and Technology, Thuwal (SA); Saudi Arabian Oil Company, Dhahran (SA)

(72) Inventors: Mohamed Eddaoudi, Thuwal (SA); Prashant Bhatt, Thuwal (SA)

(73) Assignees: King Abdullah University of Science and Technology, Thuwal (SA); Saudi Arabian Oil Company, Dhahran (SA)

( * ) Notice: Subject to any disclaimer, the term of this patent is extended or adjusted under 35 U.S.C. 154(b) by 582 days.

(21) Appl. No.: 18/187,798

(22) Filed: Mar. 22, 2023

(65) Prior Publication Data

US 2024/0316530 A1 Sep. 26, 2024

(51) Int. Cl.
| | |
|---|---|
| B01J 20/22 | (2006.01) |
| B01D 53/62 | (2006.01) |
| B01D 53/81 | (2006.01) |
| B01J 20/30 | (2006.01) |
| C07F 15/04 | (2006.01) |

(52) U.S. Cl.
CPC ............ B01J 20/226 (2013.01); B01D 53/62 (2013.01); B01D 53/81 (2013.01); B01J 20/3085 (2013.01); C07F 15/04 (2013.01); B01D 2253/204 (2013.01); B01D 2257/504 (2013.01)

(58) Field of Classification Search
CPC .. B01J 20/226; B01J 20/3085; B01J 31/1691; B01D 53/62; B01D 53/81; B01D 2253/204; B01D 2257/504; B01D 53/02; C07F 15/04
See application file for complete search history.

(56) References Cited

U.S. PATENT DOCUMENTS

| | | | |
|---|---|---|---|
| 5,376,614 | A | 12/1994 | Birbara et al. |
| 5,876,488 | A | 3/1999 | Birbara et al. |
| 7,799,120 | B2 | 9/2010 | Yaghi et al. |
| 8,926,736 | B2 | 1/2015 | Serre et al. |
| 9,138,719 | B1 | 9/2015 | Eddaoudi et al. |
| 9,139,599 | B1 | 9/2015 | Eddaoudi et al. |

(Continued)

FOREIGN PATENT DOCUMENTS

| | | |
|---|---|---|
| CN | 109422771 A | 3/2019 |
| CN | 115746318 A | 3/2023 |

(Continued)

OTHER PUBLICATIONS

English machine translation of KR 101176875 B1 (Year: 2012).*

(Continued)

*Primary Examiner* — Anthony J Zimmer
*Assistant Examiner* — Abdul-Rahman Yusuf Waleed Smari
(74) *Attorney, Agent, or Firm* — Leason Ellis LLP

(57) ABSTRACT

Provided herein are mixed ligand metal organic framework (ML-MOF) materials having rectangular grids characterized by the general formula $M_aM_bF_{6-n}(O/H_2O)_n(Ligand')_x(Ligand'')_y(solvent)_z$, which are effective for capture of carbon dioxide from a fluid composition.

20 Claims, 6 Drawing Sheets

(56) References Cited

U.S. PATENT DOCUMENTS

| | | | |
|---|---|---|---|
| 9,527,872 | B2 | 12/2016 | Thompson et al. |
| 9,707,540 | B2 | 7/2017 | Van Der Boom et al. |
| 10,087,205 | B2 | 10/2018 | Yaghi et al. |
| 10,328,380 | B2 | 6/2019 | Eddaoudi et al. |
| 10,328,414 | B2 | 6/2019 | Eddaoudi et al. |
| 10,335,779 | B2 | 7/2019 | Eddaoudi et al. |
| 10,647,733 | B2 | 5/2020 | Lin et al. |
| 10,744,482 | B2 | 8/2020 | Eddaoudi et al. |
| 10,850,268 | B2 | 12/2020 | Eddaoudi et al. |
| 10,857,500 | B2 | 12/2020 | Eddaoudi et al. |
| 11,077,423 | B2 | 8/2021 | Eddaoudi et al. |
| 11,124,529 | B2 | 9/2021 | Helal et al. |
| 11,344,870 | B2 | 5/2022 | Eddaoudi et al. |
| 2015/0291870 | A1 | 10/2015 | Van Horn et al. |
| 2016/0130199 | A1 | 5/2016 | Nair et al. |
| 2017/0137450 | A1 | 5/2017 | Eddaoudi et al. |
| 2017/0247622 | A1 | 8/2017 | Eddaoudi et al. |
| 2020/0269194 | A1 | 8/2020 | Al-Maythalony et al. |
| 2022/0106334 | A1 | 4/2022 | Jiang et al. |

FOREIGN PATENT DOCUMENTS

| | | | | |
|---|---|---|---|---|
| JP | 2015086218 | A | * | 5/2015 |
| KR | 101176875 | B1 | | 8/2012 |
| KR | 101625487 | B1 | | 5/2016 |
| WO | 2014074679 | A1 | | 5/2014 |

OTHER PUBLICATIONS

International Search Report and Written Opinion in corresponding PCT Application No. PCT/US2024/019732, mailed Jul. 12, 2024; 13 pages.

Liu at al: Enabling Fluorinated MOF-Based Membranes for Simultaneous Removal of H2S and CO2 from Natural Gas; Angewandte Chemie, Wiley-VCH Verlag GMBH & Co. KGAA, DE, vol. 130, No. 45; Oct. 11, 2018; Abstract; on page one; figures 1 and 2a.

Liu et al: Enabling Fluorinated MOF-Based Membranes for Simultaneous Removal of H2S and CO2 from Natural Gas; Sep. 19, 2018; Figures 1-2; examples 1-3.

Vaidhyanathan et al. "Direct Observation and Quantification of CO2 Binding Within an Amine-Functionalized Nanoporous Solid." Science, vol. 330, Oct. 29, 2010, 650-653.

Veawab et al. "Corrosion Behavior of Carbon Steel in the CO2 Absorption Process Using Aqueous Amine Solutions." Ind. Eng. Chem. Res., 1999, 3917-3924.

Wang et al. "Colossal cages in zeolitic imidazolate frameworks as selective carbon dioxide reservoirs." Nature Publishing Group, 2008, 207-212.

Yang et al. "Computational Study of CO2 Storage in Metal-Organic Frameworks." American Chemical Society, 2008, 1562-1569.

Yang et al. "Hydrothermal synthesis and characterization of a series of luminescent Zn(ii) and Cd(ii) coordination polymers with the new versatile m ultidentate ligand 1,3-di(1,2,4-triazol-4-yl)benzene." Crystengcomm, vol. 15, No. 40, Jan. 1, 2013, 8097.

Yang et al. "Molecular Simulation of Separation of CO2 from Flue Gases in Cu-BTC Metal-Organic Framework." AIChE Journal, Nov. 2007, 2832-2840.

Yazaydin et al. "Screening of metal-organic frameworks for carbon dioxide capture from flue gas using a combined experimental and modeling approach." J. Am. Chem. Soc. 131, 2009, 18198-18199.

Babarao et al. "Molecular screening of metal-organic frameworks for CO2 storage." Langmuir, 24, 2008, 6270-6278.

Bae et al. "Carborane-based metal-organic frameworks as highly selective sorbents for CO2 over methane." Chem. Commun., 2008, 4135-4137.

Banerjee et al. "Control of Pore Size and Functionality in Isoreticular Zeolitic Imidazolate Frameworks and their Carbon Dioxide Selective Capture Properties." JACS Communications, 2009, 3875-3877.

Banerjee et al. "High-Throughput Synthesis of Zeolitic Imidazolate Frameworks and Application to CO2 Capture." Science, Feb. 15, 2008, 939-943.

Barcia et al. "Single and multicomponent sorption of CO2, CH4 and N2 in a microporous metal-organic framework." Sep. Sci. Technol. 43,, 2008, 3494-3521.

Bastin et al. "A Microporous Metal-Organic Framework for Separation of CO2/N2 and CO21CH4 by Fixed-Bed Adsorption." J. Phys. Chem., 2008, 1575-1581.

Belmabkhout et al. "Amine-Bearing Mesoporous Silica for CO2 and H2S Removal from Natural Gas and Biagas." Langmuir Letter, 2009, 13275-13278.

Belmabkhout et al. "Isothermal versus Non-isothermal Adsorption-Desorption Cycling of Triamine-Grafted Pore-Expanded MCM-41 Mesoporous Silica for CO2 Capture from Flue Gas." Energy & Fuels Article, American Chemical Society, 2010, 5273-5280.

Belmabkhout et al. "Simultaneous Adsorption of H2S and CO2 on Triamine-Grafted Pore-Expanded Mesoporous MCM-41 Silica." Energy & Fuels, ACS Publications, 2011, 1310-1315.

Britt et al. "Highly efficient separation of carbon dioxide by a metal-organic framework replete with open metal sites." Dec. 8, 2009, 20637-20640.

Burd et al. "Highly Selective Carbon Dioxide Uptake by [Cu(bpy-n)2(SiF6)] (bpy-1 = 4,4'-Bipyridine; bpy-2 = 1,2-Bis (4-pyridyl)ethene)." Journal of the American Chemical Society, Feb. 8, 2012, 3663-3666.

Cadiau et al. "Hydrothermal synthesis, ab-initio structure determination and NMR study of the first mixed Cu—Al nuorinated MOF." CrystEngComm, The Royal Society of Chemistry, 2013, 3430-3435.

Cadiau et al. "ZnAlF5'[TAZ]: An A1 fluorinated MOF of MIL-53{A1} topology with cationic {Zn{1,2,4 triazole)}2 + linkers." Journals of Materials Chemistry, vol. 21, 2011, 3949-3951.

Caskey et al. "Dramatic Tuning of Carbon Dioxide Uptake via Metal Substitution in a Coordination Polymer with Cylindrical Pores." JAGS Communications, 2008, 10870-10871.

Chue et al. "Comparison of Activated Carbon and Zeolite 13X for COa Recovery from Flue Gas by Pressure Swing Adsorption." Ind. Eng. Chem. Res., 1995, 591-598.

Couck et al. "An Amine-Functionalized MIL-53 Metal-Organic Framework with Large Separation Power for CO2 and CH4." JACS, 2009.

Dietzel et al. "Adsorption properties and structure of CO2 adsorbed on open coordination sites of metal-organic framework Ni2 (dhtp) from gas adsorption, IR spectroscopy and X-ray diffraction." ChemComm, 2008, 5125-5127.

Dietzel et al. "Hydrogen adsorption in a nickel based coordination polymer with open metal sites in the cylindrical cavities of the desolvated framework." 2006, 959-961.

Ding et al. "Hydrothermal syntheses and characterization of a series of luminescent Cd(ii) frameworks with pyridine-based and benzene-based bis-triazole ligands." Crystengcomm, vol. 15, No. 13, Jan. 1, 2013, 2490-2503.

Finsy et al. "Separation of CO2/CH4 mixtures with the MIL-53(Al) metal-organic." Microporous and Mesoporous Materials, 2009, 221-227.

Furkawa et al. "Storage of Hydrogen, Methane, and Carbon Dioxide in Highly Porous Covalent Organic Frameworks for Clean Energy Applications." JAGS Article, American Chemical Society, 2009, 8875-8883.

Gautier et al. "On the Origin of the Differences in Structure Directing Properties of Polar Metal Oxyfluoride [MOxF6-x]2 - (x=1,2) Building Units." Inorganic Chemistry, Jan. 22, 2015, 1712-1719.

Gautier et al. "Orientatinal order of [VOF5]2- and [NbOF5)2— polar units in chains." Journal of Solid State Chemistry, vol. 195, Jan. 24, 2012, 132-139.

Guillory et al. "Evidence for Nonpolar Alignment of (NbOF 5] 2—Anions in Cd{pyridine) 4 NbOF 5 Chains." Crystal Growth & Design, Feb. 1, 2006, 382-389.

Haisheng et al. "Microporosity, Optical Bandgap Sizes, and Photocatalytic Activity of M(I)-Nb{V) (M = Cu, Ag) Pxyfluoride Hybrids." Crystal Growth & Design Article, vol. 10, 2010, 1323-1331.

Halasyamani et al. "Syntheses and Structures of Two New Cu/Nb/pyrazine Complexes: Three Dimensional CuNb (pyz)20F5-

(56) References Cited

OTHER PUBLICATIONS (pyz)(H20) and Two Dimensional [Cu(pyz)2.5J+[NbF6-(Pyz)." Zeitschrift fur anorganische und allgemeine Chemie, 1996, 479-485.

Hamon et al. "Comparative Study of Hydrogen Sulfide Adsorption in the MIL-53(Al, Cr, Fe), MIL-47(V), MIL-100(Cr), and MIL-101(Cr) Metal-Organic Frameworks at Room Temperature." JAGS Communications, Mar. 2, 2009, 8775-6777.

Hao et al. "Upgrading low-quality natural gas with H2S- and CO2-selective polymer membranes Part I. Process design and economics of membrane stages without recycle streams." Journal of Membrane Science, 2002, 177-206.

Heier et al. "The Polar [W02F4]2-Anion in the Solid State." Inorg. Chem., 1999, 762-767.

Hook et al. "An Investigation of Some Sterically Hindered Amines as Potential Carbon Dioxide Scrubbing Compounds." Ind. Eng. Chem. Res., 1997, 1779-1790.

Izumi et al. "Examining the Out-of-Center Distortion in the (NbOF 5] 2-Anion." Inorganic Chemistry, Feb. 1, 2005, 884-895.

Li et al. "Gas Adsorption and Storage in Metal-Organic Framework MOF-177." Langmuir, 2007, 12937-12944.

Lin et al. "Microporosity, Optical Bandgap Sizes, and Photocatalytic Activity of M(I)-Nb(V) (M =Cu, Ag) Oxyfluoride Hybrids." Crystal Growth & Design, vol. 10, No. 3, 2010, 1323-1331.

Llewellyn et al. "High Uptakes of CO2 and CH4 in Mesoporous Metal-Organic Frameworks MIL-100 and MIL-101." Langmuir, American Chemical Society, 2008, 7245-7250.

Maggard et al. "Understanding the Role of Helical Chains in the Formation of Noncentrosymmetric Solids." American Chemical Society, 2001, 7742-7743.

Mahenthirarajah et al. "Organic-inorganic hybrid chains and layers constructed from copper-amine cations and early transition metal (Nb, Mo) oxyfluoride anions." Dalton Transaction, Jan. 1, 2009, p. 3280.

Mandal et al. "Simultaneous absorption of CO2 and H2S into aqueous blends of N-methyldiethanolamine and diethanolamine." Environ. Sci. Technol. 2006, 40, 6076-6084.

Marvel et al. "Chemical Hardness and the Adaptive Coordination Behavior of the d 0 Transition Metal Oxide Fluoride Anions."

Zeitschrift Fur Anorganische und Allgemeine Chemie., vol. 635, No. 6-7, May 31, 2009, 869-877.

Noro et al. "A New, Methane Adsorbent, Porous Coordination Polymer [{CuSiF6(4,4'-bipyridine)2}n]", Angew. Chem. Int. Ed., 2000, 2081-2084.

Noro et al. "Framework Engineering by Anions and Porous Functionalities of Cu(III)/4,4'-bpy Coordination Polymers." JAGS Articles, vol. 124, 2002, 2568-2583.

Nugent et al. "Enhancement of CO2 selectivity in a pillared pcu MOM platform through pillar substitution." ChemComm, The Royal Society of Chemistry, 2013, 1606-1608.

Nugent et al. "Porous materials with optimal adsorption thermodynamics and kinetics for CO2 separation." Nature, Mar. 7, 2013, 80-84.

Park et al. "Exceptional chemical and thermal stability of zeolitic imidazolate frameworks." PNAS, Jul. 5, 2006, 10186-10191.

Phan et al. "Synthesis, Structure, and Carbon Dioxide Capture Properties of Zeolitic Imidazolate Framerworks." Accounts of Chemical Research, vol. 43, No. 1, Oct. 30, 2009, 58-67.

Shekhah et al. "Made-to-order metal-organic frameworks for trace carbon dioxide removal and air capture." Nature Communications, Jun. 25, 2014, 1-7.

Siriwardane et al. "Adsorption of CO2 on Molecular Sieves and Activated Carbon." Energy & Fuels, American Chemical Society, 2001, 279-284.

Skoulidas et al. "Self-Diffusion and Transport Diffusion of Light Gases in Metal-Organic Framework Materials Assessed Using Molecular Dynamics Simulations." J. Phys. Chem., 2005, 15760-15768.

Smida et al. "Hydrothermal synthesis, thermal decomposition and optical properties of Fe2F5(H20)(Htaz)(taz) (Hdma)." Arabian Journal of Chemistry, Apr. 19, 2015, 6.

Subramanian et al. "Porous Solids by Design: [Zn(4,4'-bpy)2(SiF6)]n-xDMF, a Single Framework Octahedral Coordination Polymer with Large Square Channels." Angew. Chem. Int Ed. Engl., 1995, 2127-2129.

Uemura et al. "Syntheses, Crystal Structures and Adsorption Properties of Ultramicroporous Coordination Polymers Constructed from Hexafluorosilicate Ions and Pyrazine." Eur. J. Inorg. Chem., 2009, 2329-2337.

* cited by examiner (l)

(m)

(n)

(o)

(p)

FLUORINATED MOF MATERIALS HAVING RECTANGULAR CHANNELS, METHOD OF SYNTHESIZING MOF MATERIALS AND METHODS OF USING MOF MATERIALS INCLUDING FOR CO₂ CAPTURE

BACKGROUND

Field of the Invention

The present disclosure relates to metal-organic framework materials and applications of metal-organic framework materials in $CO_2$ capture.

Description of Related Art

Global warming and associated climate changes are one of the biggest challenges faced by humanity in recent times. An increase in atmospheric $CO_2$ concentration over the last century, mainly owing to industrial and vehicular $CO_2$ emissions, is directly related to global warming.

As of now, $CO_2$ concentration in the atmosphere has reached around 415 ppm and is increasing continuously at the rate of 2-3 ppm per year. If $CO_2$ emissions are not stopped or reduced drastically, we will cross a tipping point of 450 ppm $CO_2$ concertation in a few years, which will lead to a series of never-ending environmental catastrophes.

The world is in no position to stop or significantly lessen the use of fossil fuels and will be dependent on fossil fuels for at least the next few decades. In such a scenario, $CO_2$ capture is an important technology for mitigation of increasing $CO_2$ concentration in the atmosphere and accompanying global warming. There are efforts being made to develop material and technology to capture $CO_2$ from flue gas (industrial emission). $CO_2$ capture from flue gas is carried out at 10-15% $CO_2$ concentration, and there are emerging technologies for this purpose; however, it is still considered difficult. Among the investigated materials, liquid amines and other amine-based chemisorbent have been investigated for this application. However, these chemisorbent materials require very high energy for regeneration (100-120 kJ/mol); this would practically nullify positive impacts of $CO_2$ capture. Moreover, amine-based materials are prone to degradation and produce toxic decomposition products that can have a detrimental effect on the environment. Another approach is to use physisorbent materials, where the driving force of $CO_2$ adsorption is nonbonding interaction between material and $CO_2$.

Metal-organic framework (MOF) materials are a class of adsorbent that has received attention mainly because of the crystalline and modular nature that can be used in a variety of applications ranging from separation, storage, catalysis, sensor, electrochemistry, etc. Various MOF materials have shown remarkable $CO_2$ capture properties, including KAUST-7 which has a strong affinity for $CO_2$ and saturates at a very low concentration of $CO_2$, and is capable of adsorbing a considerable amount of $CO_2$ (around 55 mg/g) at the atmospheric concentration (400 ppm $CO_2$) and can be a potential candidate for direct air capture (DAC) applications. KAUST-7 has also demonstrated excellent $CO_2$ capture performance from flue gas (around 10% $CO_2$) at 55° C. in the presence of humidity after vacuum swing regeneration (VSA) or pressure swing regeneration (PSA). However, to deploy MOFs industrially as $CO_2$ adsorbent with PSA regeneration, it should have good working capacity under partial pressure range of $CO_2$ required for existing commercial PSA processes. One such process requires good working capacity between 80-200 torr (0.1-0.26 bar) $CO_2$ partial pressure.

U.S. Pat. Nos. 10,335,779, 10,850,268 and 11,344,870, which are incorporated by reference herein, disclose MOF materials comprising metal nodes and N-donor organic ligands, and methods for capturing chemical species from fluid compositions comprise contacting a metal organic framework characterized by the formula $[M_aM_bF_{6-n}(O/H_2O)w(Ligand)_x(solvent)_y]_z$ with a fluid composition and capturing one or more chemical species from the fluid composition. U.S. Pat. Nos. 10,328,414, 10,744,482, 11,077,423, which are incorporated by reference herein, disclose MOF materials having high selectivity and stability in the present of gases and vapors including $H_2S$, $H_2O$, and $CO_2$, comprising metal nodes and N-donor organic ligands, and methods of making metal organic frameworks. Embodiments therein MOF compositions comprising a pillar characterized by the formula $(M_bF_5(O/H2O))$, where $M_b$ is selected from periodic groups IIIA, IIIB, IVB, VB, VIB, and VIII; and a square grid characterized by the formula $(M_a(ligand)_x)$, where $M_a$ is selected from periodic groups IB, IIA, IIB, IIA, IVA, IVB, VIB, VIIB, and VIII, ligand is a polyfunctional organic ligand, and x is 1 or more; wherein the pillaring of the square grid with the pillars forms the metal-organic framework. U.S. Pat. Nos. 10,328,380 and 10,857,500, which are incorporated by reference herein, disclose MOF materials comprising metal nodes and N-donor organic ligands which have high selectivity and stability in the present of gases and vapors including $H_2S$, $H_2O$, and $CO_2$; methods include capturing one or more of $H_2S$, $H_2O$, and $CO_2$ from fluid compositions, such as natural gas.

In regard to the above background information, the present disclosure is directed to provide a technical solution for $CO_2$ capture using MOF materials.

SUMMARY OF THE INVENTION

A mixed ligand metal organic framework (ML-MOF) having rectangular grids is disclosed herein. The ML-MOF is characterized by the general formula $M_aM_bF_{6-n}(O/H_2O)_n(Ligand')_x(Ligand'')_y(solvent)_z$, wherein: $M_a$ comprises an element selected from the Periodic Table of the Elements IUPAC Groups 11, 2, 12, 13, 14, 6, 7 or 8-10 (CAS Groups IB, IIA, IIB, IIIA, IVA, IVB, VIB, VIIB, or VIII); $M_b$ comprises an element selected from the Periodic Table of the Elements IUPAC Groups 13, 3, 4, 5, 6, 8-10 (CAS Groups IIIA, IIIB, IVB, VB, VIB, or VIII); Ligand' and Ligand'' are of different lengths; n=0-4; x=1; y=1; and z=0-4.

In certain embodiments, a ML-MOF having rectangular grids is provided having: a pillar characterized by the formula $(M_bF_{6-n}(O/H_2O)_n)$, wherein $M_b$ comprises an element selected from the Periodic Table of the Elements IUPAC Groups 13, 3, 4, 5, 6, 8-10 (CAS Groups IIIA, IIIB, IVB, VB, VIB, or VIII) and n=0-4; and a rectangular grid characterized by the formula $(M_a(Ligand')_x(Ligand'')_y)$, wherein Ligand' and Ligand'' are of different lengths, $M_a$ comprises an element selected from the Periodic Table of the Elements IUPAC Groups 11, 2, 12, 13, 14, 6, 7 or 8-10 (CAS Groups IB, IIA, IIB, IIIA, IVA, IVB, VIB, VIIB, or VIII), x=1 and y=1. The rectangular grid and pillar associate to form the metal-organic framework.

In certain embodiments, a method of fabricating a ML-MOF is provided. The method generally comprises: combining a hydrofluoric acid solution, a first metal source, a second metal source, and a solvent, sufficient to form a mixture; reacting the mixture over a period of time sufficient to form a reacted mixture, processing the reacted mixture to provide a metal organic framework via pillaring of rectangular grids with a pillar. The pillar is characterized by the formula $(M_bF_{6-n}(O/H_2O)_n)$, wherein $M_b$ comprises an element selected from the Periodic Table of the Elements IUPAC Groups 13, 3, 4, 5, 6, 8-10 (CAS Groups IIIA, IIIB, IVB, VB, VIB, or VIII) and n=0-4. The rectangular grids are characterized by the formula $(M_a(Ligand')_x(Ligand'')_y)$, wherein $M_a$ comprises an element selected from the Periodic Table of the Elements IUPAC Groups 11, 2, 12, 13, 14, 6, 7 or 8-10 (CAS Groups IB. IIA, IIB, IIIA, IVA, IVB, VIB. VIIB, or VIII), x=1 and y=1, and Ligand' and Ligand'' are of different lengths. In certain embodiments of the herein ML-MOFs or methods of making the ML-MOFs, n=1.

In certain embodiments of the herein ML-MOFs or methods of making the ML-MOFs, $M_a$ is selected from the group consisting of $Cu^{2+}$, $Zn^{2+}$, $Co^{2+}$, $Ni^{2+}$, $Mn^{2+}$, $Zr^{2+}$, $Fe^{2+}$, $Ca^{2+}$, $Ba^{2+}$, $Pb^{2+}$, $Pt^{2+}$, $Pd^{2+}$, $Ru^{2+}$, $Rh^{2+}$, $Cd^{2+}$, $Mg^{2+}$, $Al^{3+}$, $Fe^{2+}$, $Fe^{2+}$, $Cr^{2+}$, $Cr^{2+}$, $Ru^{2+}$, $Ru^{3+}$ and $Co^{3+}$. In certain embodiments of the herein ML-MOFs or methods of making the ML-MOFs, $M_b$ is selected from the group consisting of $Al^{3+}$, $Fe^{2+}$, $Fe^{3+}$, $Cr^{2+}$, $Cr^{3+}$, $Ti^{3+}$, $V^{3+}$, $V^{5+}$, $Sc^{3+}$, $In^{3+}$, $Nb^{5+}$ and $Y^{3+}$.

In certain embodiments of the herein ML-MOFs or methods of making the ML-MOFs, the solvent is selected from the group consisting of water, alcohols including ethanol (EtOH), dimethylformamide (DMF) and diethylformamide (DEF). In certain embodiments of the herein ML-MOFs or methods of making the ML-MOFs, the solvent comprises water and ethanol (EtOH).

In certain embodiments of the herein ML-MOFs or methods of making the ML-MOFs, Ligand' and Ligand'' are each a different organic, poly-functional. N-donor ligand. In certain embodiments. Ligand' and Ligand'' are each a different bi-functional N-donor linkers having aromatic or non-aromatic monocyclic or polycyclic groups. In some embodiments Ligand' comprises pyrazine and Ligand'' comprises 4,4-bipyridine. In some embodiments Ligand' and Ligand'' are each a different polydentates, or poly-functional ligands, such as a bi-functional ligands, tri-functional ligands, or ligands with four or more functional sites; wherein: one or both of ligand' and ligand'' comprise N-donor linkers; one or both of ligand' and ligand'' comprise different poly-functional ligands; one or both of ligand' and ligand'' comprise a plurality of N-donor functional groups; one or both of ligand' and ligand'' comprise an aromatic or non-aromatic nitrogen-containing monocyclic or polycyclic group structure; or ligand' and ligand'' comprise two different aromatic or non-aromatic nitrogen-containing heterocyclic ligands. In certain embodiments, Ligand' and Ligand'' are different and one or both of Ligand' and Ligand'' are or contain one or more nitrogen-containing heterocyclic groups selected from the group consisting of pyridine, pyrazine, pyrimidine, pyridazine, triazine, thiazole, oxazole, pyrrole, imidazole, pyrazole, triazole, oxadiazole, thiadiazole, quinoline, benzoxazole, benzimidazole, and tautomers thereof. In certain embodiments, Ligand' and Ligand'' are different and one or both of Ligand' and Ligand'' are selected from the group consisting of: pyrazine, 4,4'-bipyridine, 4-[2-(pyridin-4-yl)ethynyl]pyridine, 4-[2-(pyridin-4-yl)ethenyl]pyridine, 4-[(1E)-2-(pyridin-4-yl)diazen-1-yl]pyridine, 4-[4-(pyridin-4-yl)phenyl]pyridine, 1,2-Bis(4-pyridyl)ethane, 1H-pyrazole-R-1H-pyrazole, 1H-imidazole-R-1H-imidazole, 1H-1, 2,3,4-tetrazole-R-1H-1,2,3,4-tetrazole, 1H-1,2,4-triazole-R-1H-1,2,4-triazole, bis(pyridin-4-yl)-1,2,4,5-tetrazine, 4-(2-{4-[2-(pyridin-4-yl)ethynyl]phenyl}ethynyl)pyridine, 4-(2-{4-[2-(pyridin-4-yl)ethenyl]phenyl}ethenyl)pyridine, 4-(4-{2-[4-(pyridin-4-yl)phenyl]ethynyl}phenyl)pyridine, and 4-[4'-(pyridin-4-yl)-[1,1'-biphenyl]-4-yl]pyridine, wherein R is an aliphatic, aromatic or combination of aliphatic/aromatic bridge.

In certain embodiments of the herein ML-MOFs or methods of making the ML-MOFs, Ligand' and Ligand'' are different and one or both of Ligand' and Ligand'' have the general structure H(a)-A-L-B—H(b), wherein: A and B can be the same or different groups containing donor atoms that bond to $M_a$, H(a) and H(b); each of the H(a) and H(b) are the same or different heteroatoms selected from the group consisting of N and S; and L is a link between A and B that is one or more: single, double or triple bonds; alkyl, alkenyl or alkynyl groups with 1-100 C atoms; aromatic or non-aromatic cyclic groups, including phenyl groups; diazene groups; tetrazine; a combination of one or more alkenyl groups and one or more phenyl groups; or a combination of one or more alkynyl groups and one or more phenyl groups. In certain embodiments A and/or B are selected from the group consisting of pyridine, pyrazole, imidazole, tetrazole and triazole.

In certain embodiments of the herein methods of making the ML-MOFs, reacting the mixture comprises heating the mixture to a temperature between about 80° C. to about 200° C. In certain embodiments processing the reacted mixture comprises one or more of filtering, rinsing with water, and removing excess reactants; in certain embodiments guest molecules are evacuated from the metal organic framework to create open metal sites. In certain embodiments of the herein methods of making the ML-MOFs, the first metal source is a $Ni^{2+}$ source that is nickel nitrate, hydrated nickel nitrate, nickel chloride, hydrated nickel chloride, nickel fluoride, hydrated nickel fluoride, nickel oxide, or hydrated nickel oxide. In certain embodiments, the pillar is $(NbOF_5)^{2-}$, $(AlF_5(H_2O))^{2-}$, or $(FeF_5(H_2O))^{2-}$. In certain embodiments the pillar is $(NbOF_5)^{2-}$, wherein the metal organic framework includes a double-bonded oxygen in a confined space.

Also provided herein are methods of capturing carbon dioxide from a fluid composition, comprising: contacting the ML-MOF as in described herein with a fluid composition including at least carbon dioxide; and capturing carbon dioxide from the fluid composition. For example, in such methods a suitable ML-MOF described herein includes the following parameters: n=1, x=2, y=2, Ligand' comprises pyrazine. Ligand'' comprises 4,4'-bipyridine. $M_a$ is $Ni^{2+}$, and $M_b$ is $Nb^{5+}$; with such a ML-MOF, two carbon dioxide molecules may be trapped in each rectangular grid formed by $(M_a(Ligand')_x(Ligand'')_y)$ such that each carbon dioxide molecule interacts with two F atoms. The process may operate at 0.1-0.26 bar carbon dioxide partial pressure. Capturing may comprise physical adsorption, chemisorption, or both physical adsorption and chemisorption of carbon dioxide by the metal organic framework. Chemisorption may occur by one or more captured chemical species chemically interacting with one or more open metal sites of the metal organic framework. In certain embodiments, the fluid composition further comprises: water; methane; hydrogen sulfide; water and methane; water and hydrogen sulfide; methane and hydrogen sulfide; or water, methane and hydrogen sulfide. In the above methods of capturing carbon dioxide, a further step may comprise desorbing carbon dioxide.

Any combinations of the various embodiments and implementations disclosed herein can be used. These and other aspects and features can be appreciated from the following description of certain embodiments and the accompanying drawings and claims.

Figure 1:
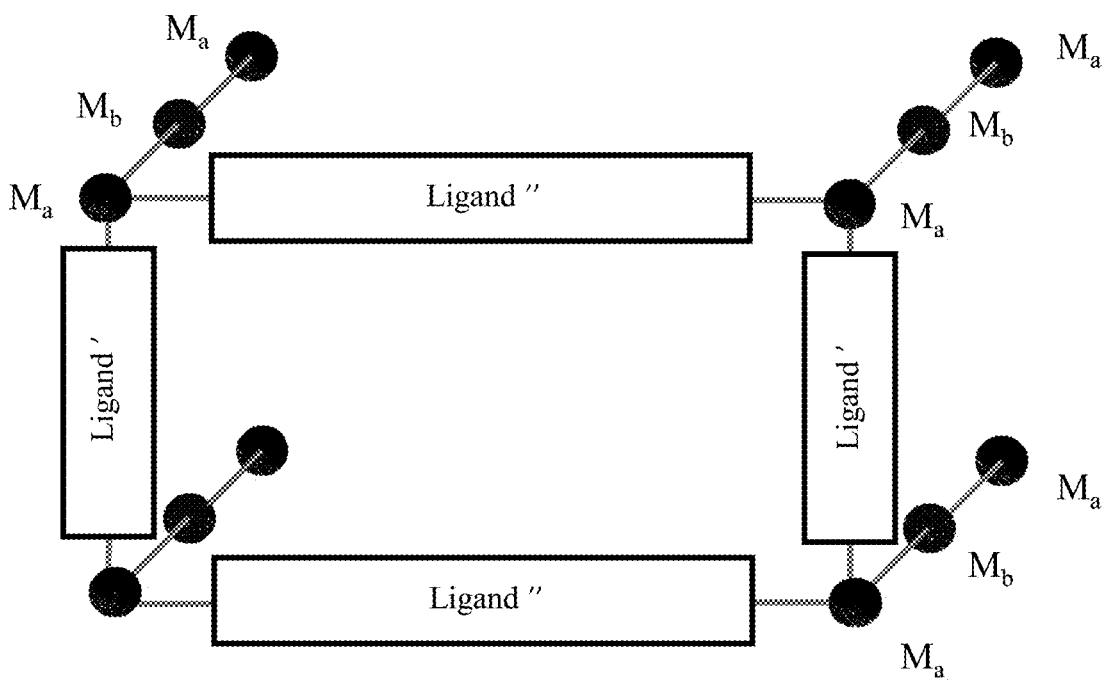
FIG. 1 is a is a schematic view of a metal organic framework having rectangular pore openings according to embodiments of this disclosure.

DETAILED DESCRIPTION OF CERTAIN EMBODIMENTS $CO_2$ capture, separation and storage using porous materials has experienced significant development in recent years in various industrial applications related to energy and environment. Among porous materials, MOFs are a versatile and promising class of crystalline solid-state materials which allow porosity and functionality to be tailored towards various applications. MOF crystal chemistry uses a molecular building block (MBB) approach that offers potential to construct MOFs where desired structural and geometrical information are incorporated into the building blocks prior to the assembly process.

Generally, MOFs comprise a network of nodes and ligands, wherein a node has a connectivity capability at three or more functional sites, and a ligand has a connectivity capability at two functional sites each of which connect to a node. Nodes are typically metal ions or metal containing clusters, and, in some instances, ligands with node connectivity capability at three or more functional sites can also be characterized as nodes. In some instances, ligands can include two functional sites capable of each connecting to a node, and one or more additional functional sites which do not connect to nodes within a particular framework. A MBB can comprise a metal-based node and an organic ligand which extrapolate to form a coordination network. Such coordination networks have advantageous crystalline and porous characteristics affecting structural integrity and interaction with foreign species (e.g., gases). The particular combination of nodes and ligands within a framework will dictate the framework topology and functionality.

MOFs, as provided herein are mixed-ligand MOFs (ML-MOFs), comprise one or more MBBs. Generally, a MBB, or a network of MBBs, as provided herein can be represented by the formula $$[(node)_4(ligand')_x(ligand'')_y(solvent)_z]_N \tag{1}$$

wherein x, y and z are 1-4, and N represents the number of molecular building blocks, and wherein ligand' and ligand" are different lengths. In embodiments where each of ligand' and ligand" connect to two nodes, x, y and z are each equal to one. Solvent represents a guest molecule occupying pores within the ML-MOF, for example as a result of ML-MOF synthesis, and can be evacuated after synthesis to provide a ML-MOF with unoccupied pores. In certain embodiments, guest molecules can include adsorbed gases, such as $CO_2$. While guest molecules can impart functionality onto a ML-MOF and are useful during synthesis to occupy pores and impart structure, solvents are not a permanent fixture of the ML-MOF. Accordingly, the value of z can vary down to zero, without changing the definitional framework of the ML-MOF. Therefore, in certain instances ML-MOFs as provided herein are represented without reference to a solvent or guest molecule component by the formula $$[(node)_a(ligand')_x(ligand'')_y]_N \tag{2}$$

Effective solvents include but are not limited to one or more of $H_2O$, alcohols including ethanol (EtOH), dimethylformamide (DMF) and diethylformamide (DEF) In certain embodiments, solvent includes $H_2O$ and EtOH. In certain embodiments, solvent can include a chemical species present after fabrication of the ML-MOF.

Some embodiments herein comprise a porous, uninhabited ML-MOF characterized by the formula (2) wherein node comprises, generally:

$$M_aM_bF_{(6-n)}(O/H_2O)_n \tag{3}$$

wherein n–0–4, in some embodiments 1. In certain embodiments $M_a$ represents a grid constituent represents a pillar constituent. According the porous, uninhabited ML-MOF having pores of rectangular cross section are represented by the formula:

$$M_aM_bF_{(6-n)}(O/H_2O)_n(ligand')_x(ligand'')_y \tag{4}$$

A schematic representation of a ML-MOF is shown in FIG. 1.

In certain embodiments $M_a$ comprises an element selected from the Periodic Table of the Elements IUPAC Groups 11, 2, 12, 13, 14, 6, 7 or 8-10 (CAS Groups IB. HA. IIB, IIIA, IVA, IVB, VIB, VIIB, or VIII). In certain embodiments, $M_b$ comprises an element selected from the Periodic Table of the Elements IUPAC Groups 13, 3, 4, 5, 6, 8-10 (CAS Groups IIIA, IIIB, IVB, VB, VIB, or VIII). In certain embodiments, $M_a$ comprises an element selected from the Periodic Table of the Elements IUPAC Groups 11, 2, 12, 13, 14, 6, 7 or 8-10 (CAS Groups IB, IIA, IIB, IIIA, IVA, IVB, VIB, VIIB, or VIII), and $M_b$ comprises an element selected from the Periodic Table of the Elements IUPAC Groups 13, 3, 4, 5, 6, 8-10 (CAS Groups IIIA, IIIB, IVB, VB, VIB, or VIII).

In certain embodiments, $M_a$ can comprise one of the following: $Cu^{2+}$, $Zn^{2+}$, $Co^{2+}$, $Ni^{2+}$, $Mn^{2+}$, $Zr^{2+}$, $Fe^{2+}$, $Ca^{2+}$, $Ba^{2+}$, $Pb^{2+}$, $Pt^{2+}$, $Pd^{2+}$, $Ru^{2+}$, $Rh^{2+}$, $Cd^{2+}$, $Mg^{2+}$, $Al^+$, $Fe^{2+}$, $Fe^{3+}$, $Cr^{2+}$, $Cr^{2+}$, $Ru^{2+}$, $Ru^{3+}$ and $Co^{3+}$. In certain embodiments, $M_b$ can be one of the following $Al^{3+}$, $Fe^{2+}$, $Fe^{3+}$, $Cr^{2+}$, $Cr^{3+}$, $Ti^{3+}$, $V^{3+}$, $V^{5+}$, $Sc^{3+}$, $In^{3+}$, $Nb^{5+}$ and $Y^{3+}$. In certain embodiments, $M_a$ can comprise one of the following cations: $Cu^{2+}$, $Zn^{2+}$, $CO_{2+}$, $Ni^{2+}$, $Mn^{2+}$, $Zr^{2+}$, $Fe^{2+}$, $Ca^{2+}$, $Ba^{2+}$, $Pb^{2+}$, $Pt^{2+}$, $Pd^{2+}$, $Ru^{2+}$, $Rh^{2+}$, $Cd^{2+}$, $Mg^{2+}$, $Al^{3+}$, $Fe^{2+}$, $Fe^{3+}$, $Cr^{2+}$, $Cr^{3+}$, $Ru^{2+}$, $Ru^{3+}$ and $Co^{3+}$; and $M_b$ can comprise one of the following cations: $Al^{3+}$, $Fe^{2+}$, $Fe^{3+}$, $Cr^{2+}$, $Cr^{3+}$, $Ti^{3+}$, $V^{3+}$, $V^{5+}$, $Sc^{3+}$, $In^{3+}$, $Nb^{5+}$ and $Y^{3+}$. In such embodiments, the ligands (ligand' and ligand") can be two different bifunctional N-donor linkers based on monocyclic or polycyclic group (aromatic or not), as described herein, wherein the ligand length of ligand' and ligand" are different.

Figure 2:
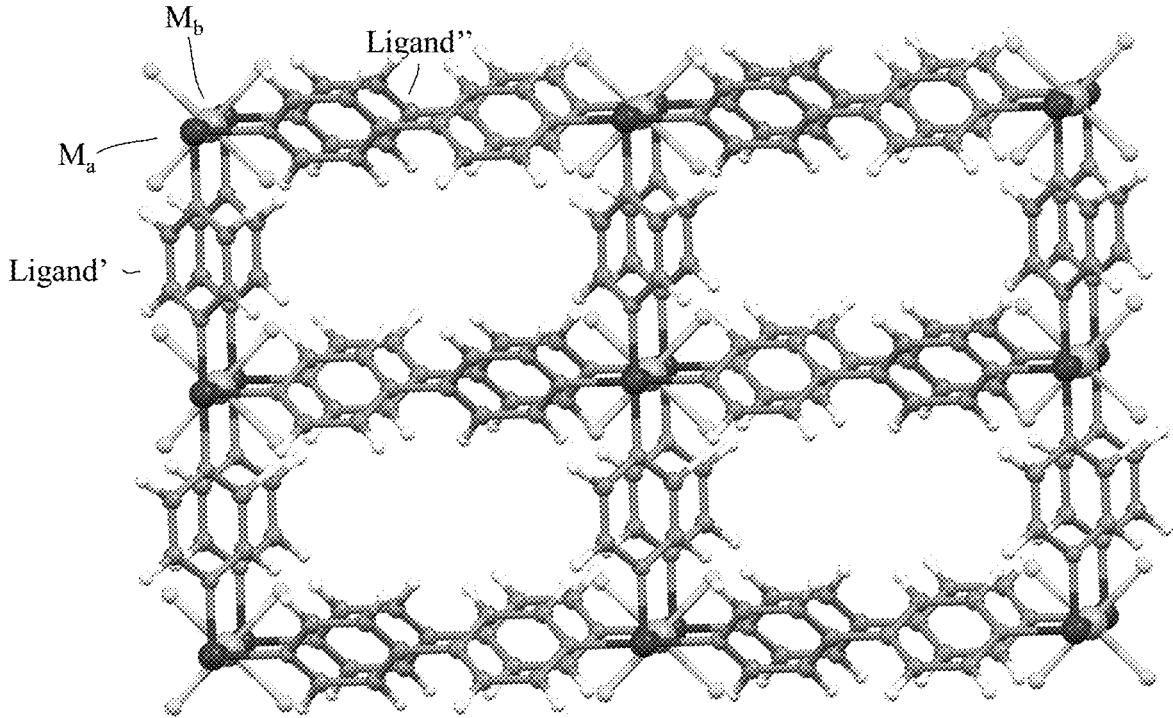
FIG. 2 is a molecular model of a metal organic framework having rectangular pore openings according to embodiments of this disclosure.
Figure 3:
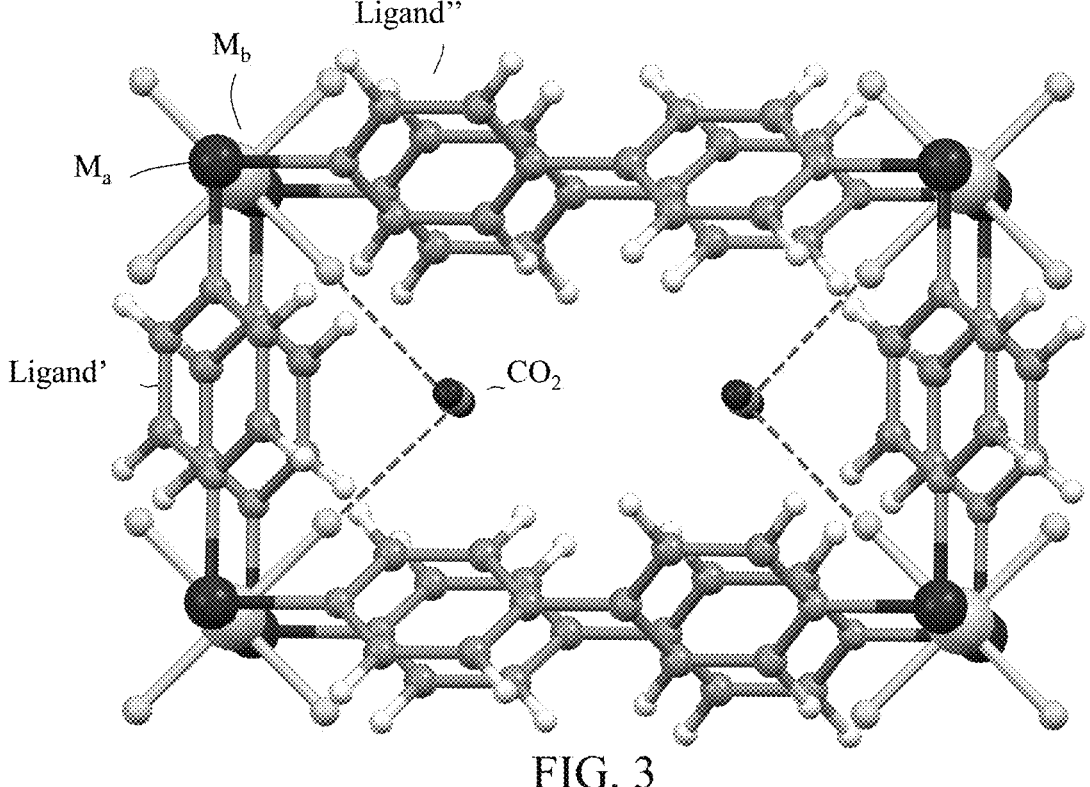
FIG. 3 is a molecular model of a metal organic framework having rectangular pore openings according to embodiments of this disclosure depicting $CO_2$ capture.

In certain embodiments, as shown in FIG. 2, $M_a$ comprises $Ni^{2+}$, ligand' comprises pyrazine (pyz) and ligand" comprises 4,4'-bipyridine (bpy) to provide a rectangular grid that can be pillared. In certain embodiments, as shown in FIG. 3, $M_a$ comprises $Ni^{2+}$, $M_b$ comprises $Nb^{5+}$, ligand' comprises pyrazine and ligand" comprises 4,4'-bipyridine, and accordingly a rectangular grid is provided that is pillared with fluorinated pillars $(NbOF_5)^2$. As shown in FIG. 3, the rectangular grid rectangular grid forms a three-dimensional structure ($NiNbOF_5$-pyz-bpy) which accommodates two $CO_2$ molecules per rectangle, wherein each $CO_2$ interacts strongly with two fluorine atoms (as shown by dashed lines).

In certain embodiments, ligand' and ligand" can comprise different polydentates, or poly-functional ligands, such as a bi-functional ligands, tri-functional ligands, or ligands with four or more functional sites. In certain embodiments, one or both of ligand' and ligand" can comprise N-donor linkers. In certain embodiments one or both of ligand' and ligand" can comprise different poly-functional ligands. In certain embodiments, one or both of ligand' and ligand" can comprise a plurality of N-donor functional groups. In certain embodiments, one or both of ligand' and ligand" can comprise monocyclic or polycyclic group structures, wherein the cyclic groups can be aromatic or non-aromatic. In certain embodiments, one or both of ligand' and ligand" can comprise a nitrogen-containing monocyclic or polycyclic group structure. In certain embodiments, ligand' and ligand" can comprise two different nitrogen-containing heterocyclic ligands.

In certain embodiments, ligand' and ligand" can comprise two different nitrogen-containing heterocyclic ligands, including pyridine, pyrazine, pyrimidine, pyridazine, triazine, thiazole, oxazole, pyrrole, imidazole, pyrazole, triazole, oxadiazole, thiadiazole, quinoline, benzoxazole, benzimidazole, and tautomers thereof.

Figure 4:
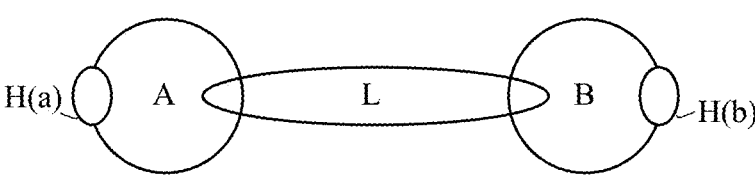
FIG. 4 is a schematic view of a ligand component according to embodiments of this disclosure.

In certain embodiments, ligand' and ligand" can comprise two different molecules having the general structure as represented by FIG. 4, or H(a)-A-L-B—H(b), wherein A and B can be the same or different groups containing donor atoms that bond to $M_a$, H(a) and H(b); each of the H(a) and H(b) are the same or different heteroatoms selected from the group consisting of N and S. Examples of A and B include pyridine, pyrazole, imidazole, tetrazole or triazole. L is a link between A and B, and can be one or more: single, double or triple bonds; alkyl, alkenyl or alkynyl groups with 1-10, 1-20, 1-50 or 1-100 carbon atoms; aromatic or non-aromatic cyclic groups, including phenyl groups; diazene groups; tetrazine; a combination of one or more alkenyl groups and one or more phenyl groups; or a combination of one or more alkynyl groups and one or more phenyl groups.

Figure 5A:
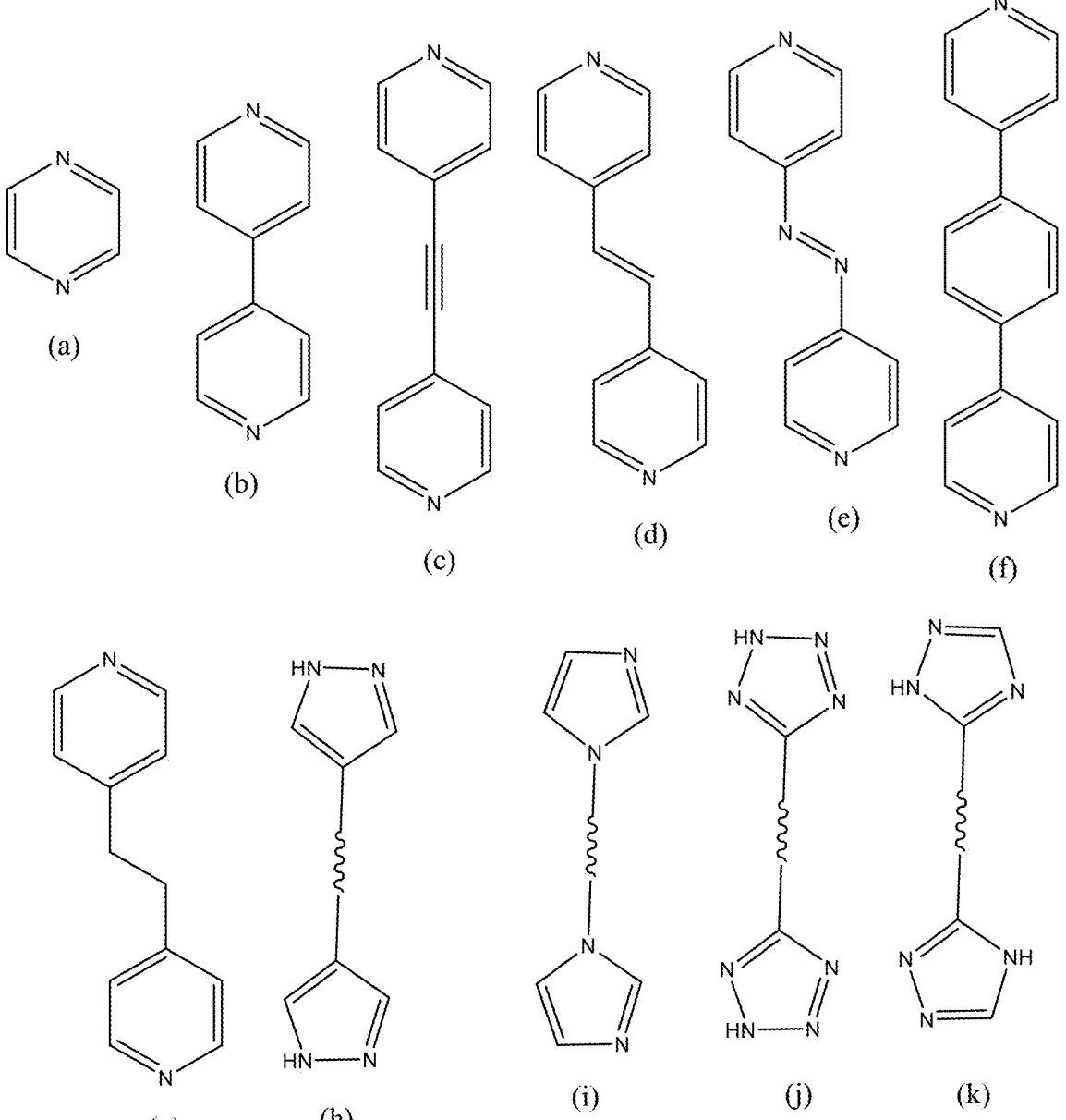
FIGS. 5A and 5B show examples of molecular structures that can be used as either or both of ligand' and ligand" according to embodiments of this disclosure.
Figure 5B:
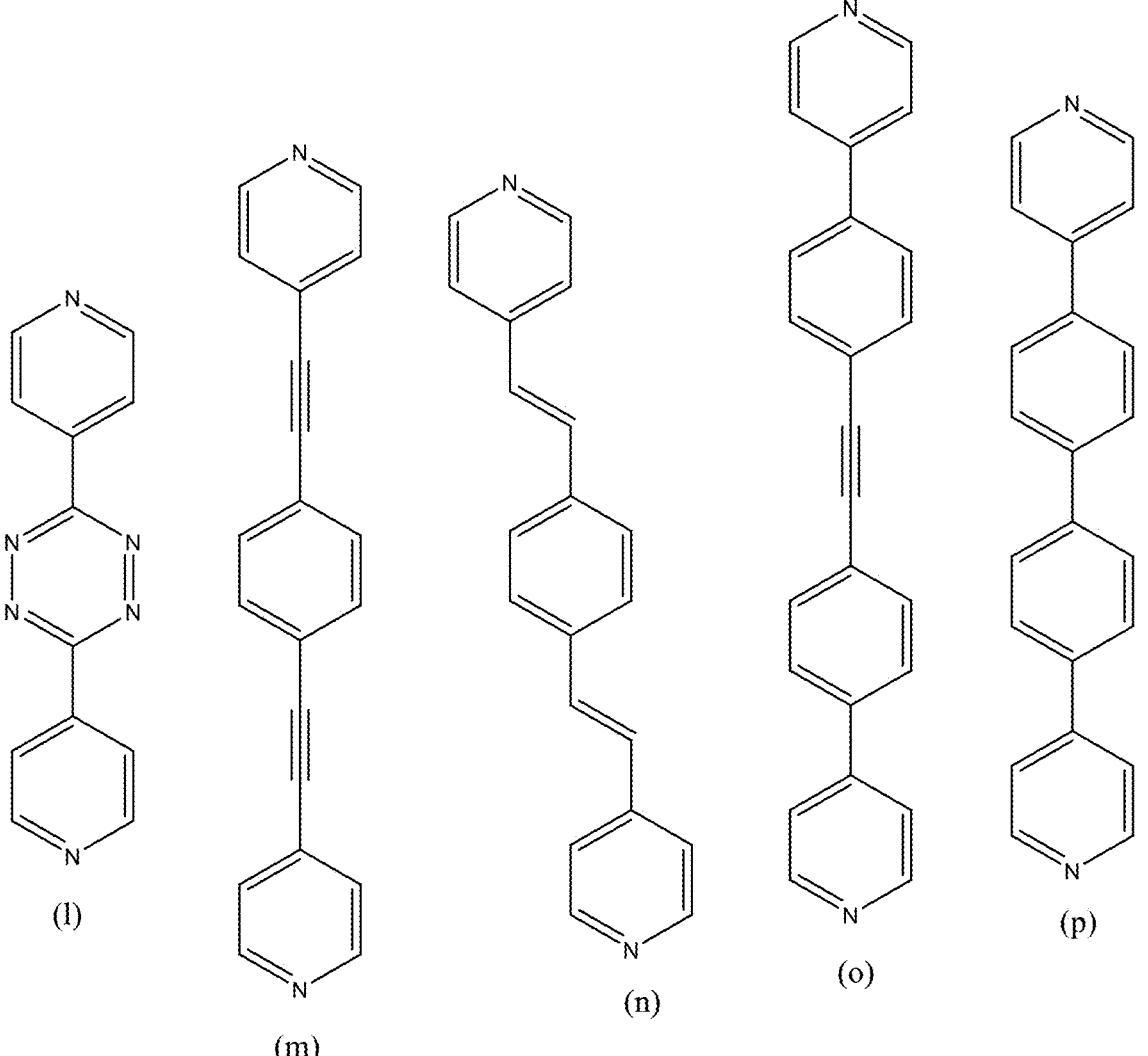

FIGS. 5A and 5B, in conjunction with Table 1, show examples of molecular structures that can be used as either or both of ligand' and ligand" (wherein different molecular structures or similar molecular structures of different lengths are selected as ligand' and ligand"), wherein R can be any aliphatic, aromatic or combination of aliphatic/aromatic bridge.

Figure 6:
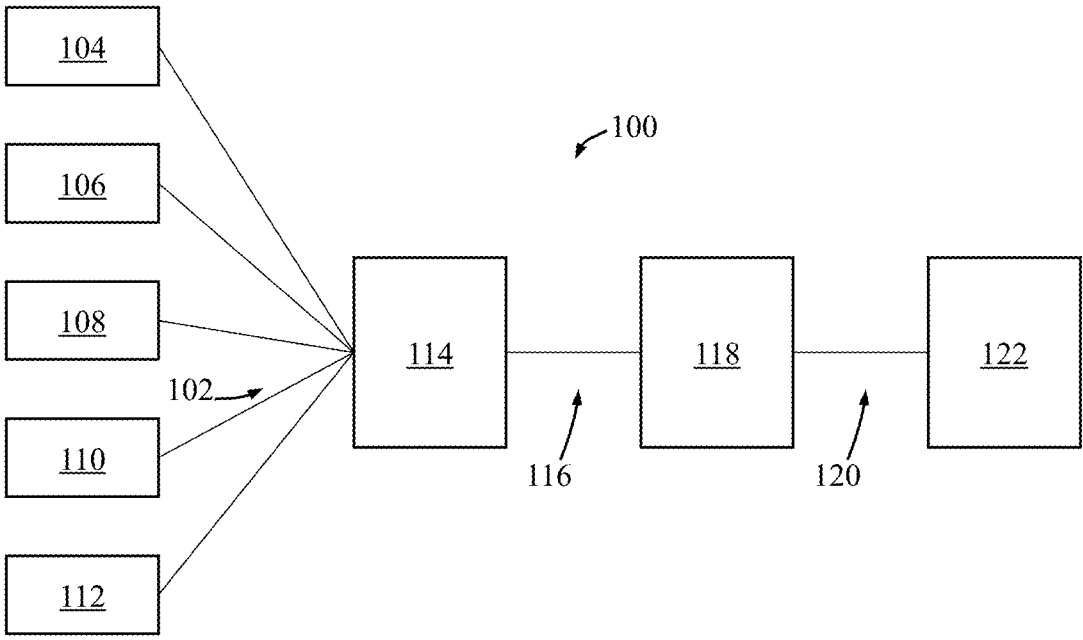
FIG. 6 is an overview of a method to make metal organic framework materials having rectangular pore openings according to embodiments of this disclosure.

In certain embodiments ML-MOFs can be fabricated using a solvo(hydro)thermal synthetic procedure. As shown in FIG. 6, a method for fabricating 100 a ML-MOF 122 can include combining 102 reactants. Reactants can include one or more of a hydrofluoric acid solution 104 with a source 106 of $M_a$, a source 108, of $M_b$, a source 110 of ligand' and ligand", and a solvent 112 to form a mixture 114. The $M_a$ and $M_a$ sources 106, 108 can include any suitable metal as above for $M_a$ and $M_a$.

In certain embodiments, $M_a$ comprises $Ni^{2+}$ and the source 106 of $M_a$ comprises or more of nickel nitrate, hydrated nickel nitrate, nickel chloride, hydrated nickel chloride, nickel fluoride, hydrated nickel fluoride, nickel oxide, or hydrated nickel oxide. In certain embodiments, $M_b$ can be one of the following $Al^{3+}$, $Fe^{2+}$, $Fe^{3+}$, $Cr^{2+}$, $Cr^{3+}$, $Ti^{3+}$, $V^{3+*}$, $V^{5+}$, $Sc^{3+}$, $In^{3+}$, $Nb^{5+}$ and $Y^{3+}$ and the source 108 of $M_b$ can be in the form of nitrates, hydrated nitrates, chlorides, hydrated chlorides, fluorides, hydrated fluorides, oxides, hydrated oxides, and combinations thereof. In certain embodiments, $M_b$ comprises $Nb^{5+}$. The solvent 112 can include one or more of $H_2O$, EtOH, dimethylformamide (DMF), and diethylformamide (DEF); in certain embodiments the solvent 112 comprises $H_2O$ and EtOH. In certain embodiments, the source 110 of ligand' comprises a source of pyrazine and the source 110 of ligand" comprises a source of 4,4'-bipyridine.

In certain embodiments, the reactivity of one of the ligands is greater that the reactivity of the other ligand, and sequence of addition of the source of ligand' and the source of ligand" is controlled to avoid the more reactive ligand (the stronger ligand) from preventing the less reactive ligand (weaker ligand) from forming the grid. For example, in embodiments in which ligand' comprises pyrazine and ligand" comprises 4,4'-bipyridine, pyrazine is added sequentially before 4,4'-bipyridine.

In certain embodiments, the reactivity of one of the ligands is greater that the reactivity of the other ligand, and a rate controlling agent is included in the reactants. For example, in embodiments in which ligand' comprises pyrazine and ligand" comprises 4,4'-bipyridine, pyridine, pyridine derivatives and/or nitrogen donor derivatives may be used as a rate controlling agent (modulator or structure directing). A rate controlling agent can be added in an amount that is 0.1-100, 0.1-50, 0.1-20, 0.1-15, 0.1-10, 1-100, 1-50, 1-20, 1-10, or 1-10 equivalent to the stoichiometric amount of ligand' and ligand".

In certain embodiments, the reactivity of one of the ligands is greater that the reactivity of the other ligand, and: sequence of addition of the source of ligand' and the source of ligand" is controlled to avoid the more reactive ligand (the stronger ligand) from preventing the less reactive ligand (weaker ligand) from forming the grid (for example, in embodiments in which ligand' comprises pyrazine and ligand" comprises 4,4'-bipyridine, pyrazine is added sequentially before 4,4'-bipyridine); and a rate controlling agent is added (for example, in embodiments in which ligand' comprises pyrazine and ligand" comprises 4,4'-bipyridine, pyridine is a suitable rate controlling agent, that can be added in an amount that is 0.1-100, 0.1-50, 0.1-20, 0.1-15, 0.1-10, 1-100, 1-50, 1-20, 1-10, or 1-10 equivalent to the stoichiometric amount of ligand' and ligand").

The method for fabricating 100 further comprises reacting 116 the mixture 114, sufficient to form a reacted mixture 118. As noted above, reaction can commence whilst reactants are added. For instance, reaction can commence with ligand' and thereafter ligand" is added.

Reacting 116 can include contacting the hydrofluoric acid solution 104, the source 106 of $M_a$, the source 108 of $M_b$, the sources 110 of ligand' and ligand" (and optional rate controlling agent) and the solvent 112. Reacting 116 can further comprise stirring or agitating the mixture 114, and/or heating the mixture 114. Heating the mixture 114 generally comprises heating to a temperature between about 80-200° C.

The reacted mixture 118 can be further processed 120 to provide a fabricated ML-MOF 120. Processing 120 can include one or more of filtering the reacted mixture 118, rinsing the reacted mixture 118 with water, and/or removing excess reactants from the reacted mixture 118. In certain embodiments, guest molecules are optionally evacuated from a fabricated ML-MOF 122. Guest molecules can include solvent guest molecules, or derivatives thereof.

In certain embodiments, one or more ML-MOFs described herein are suitable for applications involving $CO_2$ capture from flue gas, syngas, biogas and landfill gas. In certain embodiments, one or more ML-MOFs described herein are suitable for applications involving $CO_2$ removal in confined spaces. Efficient removal of $CO_2$ at low concentrations is vital for the proper operation of many confined-space systems, such as breathing systems. Confined spaces can include those found in submarines and aerospace craft. For example, in long-term space flight and submarine missions where air resupply opportunities are scarce, $CO_2$ must be removed from the air and recycled. An average crew member requires approximately 0.84 kg of oxygen and emits approximately 1 kg of carbon dioxide per day. Thus the ability to continuously purify exhaled air to a maximum $CO_2$ concentration of 2-5% will lead to an optimal recycling and considerable reduction in fresh air supply in remote confined spaces. The shortcomings of existing technologies include a low daily capture capacity, due in part to the long temperature swing adsorption cycling (TSA) mode, which is determined mainly by absorbent reactivation. In case of low $CO_2$ concentration removal, chemical adsorbents (e.g., amine supported absorbents) are preferred with a heat of adsorption of 70-100 kJ/mol. The heat of adsorption indicates the energy required to clean the material after each adsorption cycle.

In certain embodiments, to fulfil the requisite criteria for high working capacity for $CO_2$ capture, for example between 80-200 torr (0.1-0.26 bar) $CO_2$ partial pressure, the target material possesses $CO_2$ energetics between KAUST-7 (four F interacting with one $CO_2$) and dptz-CuTiF$_6$ (one F interacting per $CO_2$), as well as high $CO_2$ uptake at desired concentrations. In certain embodiments the MOFs herein permit each $CO_2$ to interact with two F to optimize MOF adsorption energy for $CO_2$ adsorption. For example, a grid structure described herein (and shown for instance with respect to FIG. 3) using ligands with different lengths such as pyrazine and 4,4' bipyridine (bpy) is a rectangular grid pillared by fluorinated pillars, such as $(NbOF_5)^{2-}$.

Figure 7:
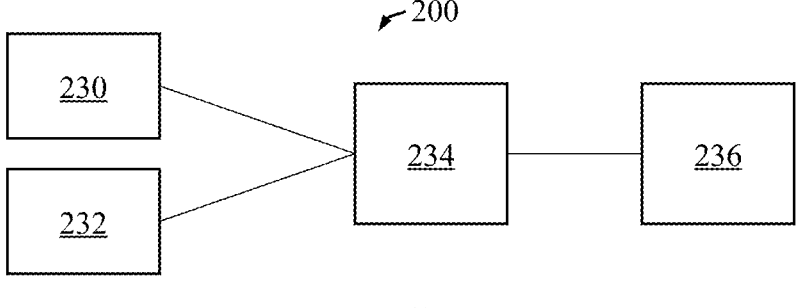
FIG. 7 is an overview of a method to use metal organic framework materials having rectangular pore openings according to embodiments of this disclosure.

FIG. 7 illustrates a method 200 for capturing 236 one or more chemical species from a fluid composition 232 via a ML-MOF 230. A method 200 for capturing 236 one or more chemical species from a fluid composition 232 can comprise contacting 234 a metal organic framework 230 characterized by the formula $[M_aM_bF_{6-n}(O/H_2O)_w(Ligand)_x(solvent)_y]_z$ with a fluid composition 232. Fluid composition 232 can comprise two or more chemical species. Method 200 can further comprise capturing 236 one or more captured chemical species from the fluid composition 232. In certain embodiments, capturing 236 comprises physical adsorption of the one or more captured chemical species by the metal organic framework 230. In certain embodiments, capturing 236 comprises chemisorption of the one or more captured chemical species by the metal organic framework. Chemisorption can occur by one or more captured chemical species chemically interacting with one or more open metal sites of the metal organic framework 230. In embodiments herein with a rectangular pore opening, multiple molecules of a chemical species can be captured. In other embodiments, capturing 236 comprises physical adsorption and chemisorption of the one or more captured chemical species by the metal organic framework. Capturing can comprise wholly or partially containing a chemical species within a pore of a ML-MOF. In certain embodiments, capturing 236 consists of chemisorption. In certain embodiments, capturing 236 consists of physical adsorption. In certain embodiments capturing comprises wholly or partially containing two or more molecules of a chemical species within a pore of a ML-MOF by chemisorption. For example, as shown in FIG. 3, two $CO_2$ molecules are contained within a pore.

In certain embodiments, the fluid composition 232 can comprise $H_2S$ and one or more of benzene, toluene, xylene, ethylbenzene, naphthalene and styrene. In such embodiments, capturing 236 can comprise capturing one or more of benzene, toluene, xylene, ethylbenzene, naphthalene, and styrene. In a specific embodiment. $M_a$ can comprise $Ni^{2+}$ and Mn can comprise $Nb^{5+}$.

In certain embodiments, the fluid composition 232 can comprise breathable air. Breathable air can include atmospheric air, or life-supporting air in a confined space. In a non-limiting example, breathable air can include one or more of oxygen, nitrogen, carbon dioxide, and argon. In such embodiments, capturing 236 can comprise capturing carbon dioxide. In such embodiments, capturing 236 can consist of capturing carbon dioxide. In such embodiments, capturing 236 occurs in a confined space. Capturing 236 can comprise capturing trace amounts of carbon dioxide.

In certain embodiments, the fluid composition 232 can comprise one or more of flue gas, syngas, biogas and landfill gas. In such embodiments, capturing 236 can comprise capturing carbon dioxide. In such embodiments, capturing 236 can consist of capturing carbon dioxide.

Some embodiments of suitable ML-MOFs can be represented by the following general formula: $[M_aM_bF_x(O/H_2O)_z(Ligand')(Ligand'')]_n$ wherein $M_a$ can be one of the following cations: $Cu^{2+}$, $Zn^{2+}$, $Co^{2+}$, $Ni^{2+}$, $Mn^{2+}$, $Zr^{2+}$, $Fe^{2+}$, $Ca^{2+}$, $Ba^{2+}$, $Pb^{2+}$, $Pt^{2+}$, $Pd^{2+}$, $Ru^{2+}$, $Rh^{2+}$, $Cd^{2+}$, $Mg^{2+}$, $Al^{3+}$, $Fe^{2+}$, $Fe^{3+}$, $C^{2+}$, $Cr^{3+}$, $Ru^{2+}$, $Ru^{3+}$ and $Co_{3+}$; $M_b$ can be one of the following $Al^{3+}$, $Fe^{2+}$, $Fe^{3+}$, $Cr^{2+}$, $Cr^{3+}$, $Ti^{3+}$, $V^{3+}$, $V^{5+}$, $Sc^{3+}$, $In^{3+}$, $Nb^{5+}$, $Y^{3+}$; and the ligand' and ligand'' bi-functional N-donor linkers based on monocyclic or polycyclic group (aromatic or not) of different lengths.

One ML-MOF synthesis strategy provided herein comprises linking inorganic chains using appropriate N-donor based linkers to deliberately generate channels along one crystallographic direction. The inorganic chains are built up from the trans-connection between $M_aN_4F_2$ and $M_bF_4$ $(H_2O)_2$ octahedra or between $M_aN_4F_2$ and $M_bF_5(H_2O)$ octahedra or between $M_aN_4F_2$ octahedra and $M_bF_5(O)$ octahedra. An inorganic chain thus formed is built up from $M_aN_4F_2$ and $M_bF_5(H_2O)$ octahedra, and resulting inorganic chains are linked to each other using bi-functional N-donor organic ligands, for example, a NiNbF$_5$O(pyrazine)(4,4'-bipyridine) structure.

The utility of ML-MOFs such as those provided herein are highly dependent upon the framework's structural features such as structural strength, density, functionality, pore aperture dimensions, pore dimensions, the ratio of pore aperture dimensions to pore dimensions, pore accessibility, and the presence of a plurality of pore dimensions and/or pore aperture dimensions (e.g., a poly-porous MOF). The originality of this new class of crystalline porous materials is based, in part, on the fact that the rectangular shaped of cavities. (i.e. rectangle based channels), is controlled from a structural point of view using appropriate cations and organic linkers of different lengths. The novel ML-MOF architectures disclosed herein offer a novel improvement on some MOF architectures by replacing silicon components with other metals, such as $Al^{3+}$, $Fe^{2+}$, $Fe^{3+}$, $V^{3+}$, $V^{4+}$, $V^{5+}$, $Nb^{5+}$, to afford highly stable materials with or without open metals sites. In certain embodiments, the use of specific cations, such as $Al^{3+}$, $Fe^{2+}$, $Fe^{3+}$, $Cr^{2+}$, $Cr^{3+}$, $Ti^{3+}$, $V^{3+}$, $V^{5+}$, $Sc^{3+}$, $In^{3+}$, $Y^{3+}$, in $M_b$ site positions can introduce open-metal sites within the channels that enhance properties of gas capture.

In certain embodiments, a $[M_aM_bF_{(6-n)}(O/H_2O)_n(\text{ligand}')_x(\text{ligand}'')_y]_N$ ML-MOF structure can include a Ni $M_a$ constituent, a $M_b$ constituent group selected from one of Al, Fe, V, or Nb, and Ligand' comprising a pyrazine constituent group and Ligand" comprising 4,4'-bipyridine. In certain embodiments a ML-MOF characterized by the formula $[M_aM_bF_{(6-n)}(O/H_2O)_n(\text{ligand}')_x(\text{ligand}'')_y]_N$ wherein $M_a$ equals Ni, Mt equals Al, Fe, V or Nb, and ligand' comprising pyrazine and Ligand" comprising 4,4'-bipyridine, the pore size (channel size) of the resulting ML-MOF can be about 2.8-10 Å. Other ranges are suitable for the combination of ligand and MOF metals. In addition, the pore size may vary based on the side in which it is measured due to the rectangular shape. In the certain embodiments, a MOF can have a specific surface area of about 250 $m^2/g$ to about 800 $m^2/g$. In either of the same MOFs or in an alternative embodiment, a MOF can have a pore volume of about 0.1 cm/g to about 0.3 $cm^3/g$. In a different embodiment, a more elongated ligand can provide an analogous MOF with much higher porosity.

In certain embodiments, $M_b$ and/or a ligand can be selected to hinder or allow rotation of a ligand. Altering the nature, shape, and dimensions of the $(M_bOF_5)^{x-}$ pillars employed in $[M_aM_bF_{6-n}(O/H_2O)_w(\text{Ligand})_x(\text{solvent})_y]_z$ MOFs can selectively hinder the free rotation of ligands and thus dictate the maximum and/or minimum opening of the pore aperture size. This approach offers potential to dial-in/command the passing-blocking of specific probe molecules. In certain embodiments $M_b$ and/or a ligand are selected to allow no rotation of a ligand. In certain embodiments $M_b$ and/or a ligand are selected to allow full rotation of a ligand. In certain embodiments $M_b$ and/or a ligand are selected to allow partial rotation of a ligand.

In certain embodiments. $M_b$ and/or a ligand can be selected to hinder or allow rotation of a pillar. Altering the nature, shape, and dimensions of the $(M_bOF_5)_{x-}$ pillars employed in $[M_aM_bF_{(6-n)}(O/H_2O)_n(\text{ligand}')_x(\text{ligand}'')_y]_N$ ML-MOFs can selectively hinder the free rotation of pillars and thus dictate the maximum and/or minimum opening of the pore aperture size. This approach offers potential to dial-in/command the passing-blocking of specific probe molecules. In certain embodiments $M_b$ and/or a ligand are selected to allow no rotation of a pillar. In certain embodiments $M_b$ and/or a ligand are selected to allow full rotation of a pillar. In certain embodiments $M_b$ and/or a ligand are selected to allow partial rotation of a pillar.

A specific ML-MOF characterized by the formula $[M_aM_bF_{(6-n)}(O/H_2O)_n(\text{ligand}')_x(\text{ligand}'')_y]_N$ is one in which: $M_a$ comprises Ni and $M_b$ comprises Nb. This MOF includes a $(NbOF_5)^2$ inorganic pillar which, due to the larger $Nb^{+5}$, has a longer Nb—F bond length (1.905(1)Å) as compared to the Si—F bond length (1.681(1)Å) of the SIFSIX MOFs described above. The increased Nb—F bond length reduces the distance between the pendant fluorine in the channel, and the relatively increased nucleophile behavior of $(N_bOF_5)^2$ provides increased stability in the presence of water. Pyrazine and 4,4'-bipyridine are suitable ligand for a ML-MOF, among others as described herein, to produce a pillared rectangular MOF based on $(NbOF_5)^{2-}$ pillars that connect a 2D rectangular grid of Ni-(pyrazine)(4,4'-bipyridine). The quadrangular-pillared rectangular MOF can be viewed as a 3D MOF wherein each NiOF(pyrazine)(4,4'-bipyridine) node serves as 6-connected node connected by $(NbOF_5)^{2-}$ pillars through fluorine/oxygen atoms giving rise to a peu topology. The assignment of one oxygen and one fluorine atom in apical position within the pillar has been previously demonstrated in similar materials and confirmed with supporting techniques.

EXAMPLES

Example 1—A stock solution of a nickel salt of a fluro-niobioum anion was prepared. NiO (1.1 g, 15 mmol), $Nb_2O_5$ (2 g, 7.5 mmol), $HF_{aq}$ 48% (6.5 ml, 0.179 mol), and 5 ml deionized water were heated at 150° C. in a 200 ml poly-tetrafluoroethylene liner containing autoclave for 24 hours to dissolve the oxides. After cooling, the resulting clear solution was transferred in another high-density plastic container and diluted with water to yield a total volume of 15 ml of a 1 M solution of the nickel salt of a fluroniobioum anion, including $NiNbOF_5$ and $NiNbOF_7$. The procedure can also be performed larger scales.

Example 2: A quantity of 1 mL, 262.2 mg (1 mmol), of the solution from Example 1, was mixed with 10 equivalents pyridine solution in EtOH (790 mg, 10 mmol), 4 equivalents pyrazine solution in EtOH (320 mg, 4 mmol), followed by 1 equivalent 4,4'-bipyridine solution in EtOH (156 mg, 1 mmol). The reaction mixture was placed in an autoclave, sealed and heated at 130° C. for 24 hours.

Figure 8:
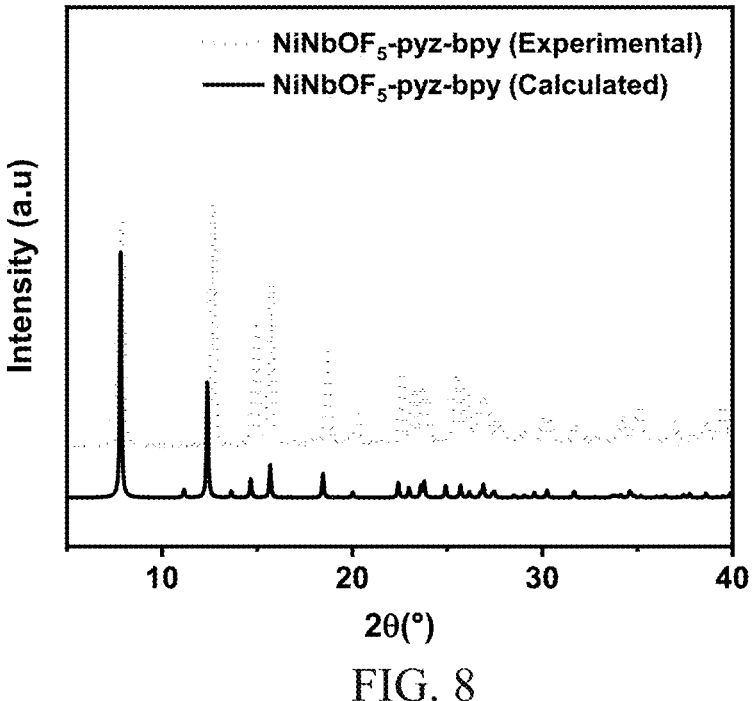
FIG. 8 shows X-ray diffraction patters of a solid NiN-bOF$_5$-pyz-bpy according to an embodiment of this disclosure and a simulated NiNbOF$_5$-pyz-bpy pattern.

The crystalline solid obtained was analyzed by powder X-ray diffraction (PXRD) and the resultant solid $NiNbOF_5$-pyz-bpy matches well with calculated PXRD from the simulated structure of $NiNbOF_5$-pyz-bpy, as shown in FIG. 8. Comparison of PXRD patterns calculated from simulated structure of $NiNbOF_5$-pyz-bpy (dashed) and experimental PXRD of $NiNbOF_5$-pyz-bpy (solid) confirms phase purity of the synthesized product.

While not wishing to be bound by theory, pyridine serves as a rate controlling agent to slow down the coordination of water and bpy by competing, hence avoiding the unwanted products. Also, to compete with stronger bpy ligand 4 equivalent of pyrazine was used. When stoichiometric amounts of the components were used in the reaction mixture, without a rate controlling agent and in the presence of water, a bipyridine square grid was formed, bpy is a relatively stronger ligand than pyz.

Figure 9:
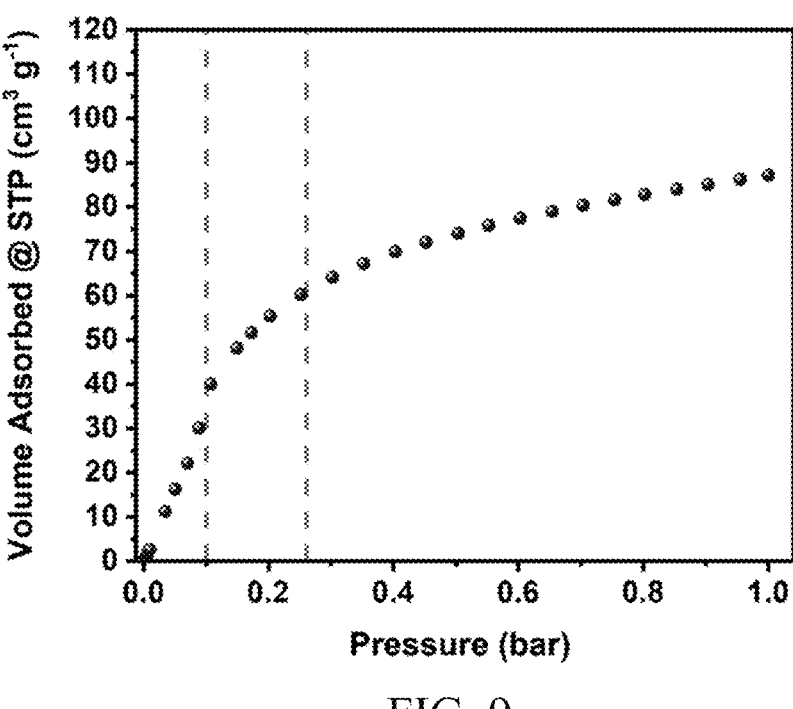
FIG. 9 depicts a $CO_2$ adsorption isotherm using a solid NiNbOF$_5$-pyz-bpy according to an embodiment of this disclosure.

Example 3: In order to study the performance of $NiNbOF_5$-pyz-bpy for adsorption of $CO_2$, testing was carried out in equilibrium conditions. FIG. 9 shows the $CO_2$ adsorption isotherm at 298 K for $NiNbOF_5$-pyz-bpy.

It is to be understood that like numerals in the drawings represent like elements through the several figures, and that not all components and/or steps described and illustrated with reference to the figures are required for all embodiments or arrangements. Further, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms ""including," "comprising," or "having," "containing," "involving," and variations thereof herein, when used in this specification, specify the presence of stated features, integers, steps, operations, elements, and/or components, but do not preclude the presence or addition of one or more other features, integers, steps, operations, elements, components, and/or groups thereof. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Unless otherwise defined, all technical and scientific terms used herein have the same meaning as commonly understood by one of ordinary skill in the art to which this invention belongs. In case of conflict, the present specification, including definitions, will control. Although methods and materials similar or equivalent to those described herein can be used in the practice or testing of embodiments of the present invention, suitable methods and materials are described below. In addition, the materials, methods, and examples are illustrative only and not intended to be limiting.

When an amount, concentration, or other value or parameter is given as either a range, preferred range or a list of upper preferable values and/or lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Notably, the figures and examples above are not meant to limit the scope of the present disclosure to a single implementation, as other implementations are possible by way of interchange of some or all the described or illustrated elements. Moreover, where certain elements of the present disclosure can be partially or fully implemented using known components, only those portions of such known components that are necessary for an understanding of the present disclosure are described, and detailed descriptions of other portions of such known components are omitted so as not to obscure the disclosure. In the present specification, an implementation showing a singular component should not necessarily be limited to other implementations including a plurality of the same component, and vice-versa, unless explicitly stated otherwise herein. Moreover, applicants do not intend for any term in the specification or claims to be ascribed an uncommon or special meaning unless explicitly set forth as such. Further, the present disclosure encompasses present and future known equivalents to the known components referred to herein by way of illustration.

The foregoing description of the specific implementations will so fully reveal the general nature of the disclosure that others can, by applying knowledge within the skill of the relevant art(s), readily modify and/or adapt for various applications such specific implementations, without undue experimentation, without departing from the general concept of the present disclosure. Such adaptations and modifications are therefore intended to be within the meaning and range of equivalents of the disclosed implementations, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s). It is to be understood that dimensions discussed or shown are drawings accordingly to one example and other dimensions can be used without departing from the disclosure.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

TABLE 1

| Structure | Name (and altnerative names) |
|---|---|
| (a) | Pyrazine |
| | pyz |
| (b) | Bipyridine |
| | 4,4'-bipyridine |
| | Bpy |
| (c) | dipyridyl acetylene |
| | 4-[2-(pyridin-4-yl)ethynyl]pyridine |
| (d) | dipyridyl ethylene |
| | 4-[2-(pyridin-4-yl)ethenyl]pyridine |
| (e) | 4-[(1E)-2-(pyridin-4-yl)diazen-1-yl]pyridine |
| (f) | 4-[4-(pyridin-4-yl)phenyl]pyridine |
| (g) | 1,2-Bis(4-pyridyl)ethane |
| (h) | bis pyrazole |
| | 1H-pyrazole-R-1H-pyrazole |
| (i) | bis imidazole |
| | 1H-imidazole-R-1H-imidazole |
| (j) | bis tetrazole |
| | 1H-1,2,3,4-tetrazole-R-1H-1,2,3,4-tetrazole |
| (k) | bis triazole |
| | 1H-1,2,4-triazole-R-1H-1,2,4-triazole |
| (l) | dipyridyl tetrazine |
| | bis(pyridin-4-yl)-1,2,4,5-tetrazine |
| (m) | 4-(2-{4-[2-(pyridin-4-yl)ethynyl]phenyl}ethynyl)pyridine |
| (n) | 4-(2-{4-[2-(pyridin-4-yl)ethenyl]phenyl}ethenyl)pyridine |
| (o) | 4-(4-{2-[4-(pyridin-4-yl)phenyl]ethynyl}phenyl)pyridine |
| (p) | 4-[4'-(pyridin-4-yl)-[1,1'-biphenyl]-4-yl]pyridine |

The invention claimed is:

1. A mixed ligand metal organic framework (ML-MOF) having rectangular grids characterized by the general formula $$M_aM_bF_{6-n}(O/H_2O)_n(\text{Ligand}')_x(\text{Ligand}'')_y(\text{solvent})_z$$

wherein $O/H_2O$ refers to O or $H_2O$, $M_a$ comprises an element selected from the Periodic Table of the Elements IUPAC Groups 11, 2, 12, 13, 14, 6, 7 or 8-10 (CAS Groups IB, IIA, IIB, IIIA, IVA, IVB, VIB, VIIB, or VIII); $M_b$ comprises an element selected from the Periodic Table of the Elements IUPAC Groups 13, 3, 4, 5, 6, 8-10 (CAS Groups IIIA, IIB, IVB, VB, VIB, or VIII); Ligand' and Ligand" are of different bond lengths; n=0–4; x=1; y=1; and z=0–4.

2. A mixed ligand metal organic framework (ML-MOF) having rectangular grids comprising:

a pillar characterized by the formula $(M_bF_{6-n}(O/H_2O)_n)$, wherein $O/H_2O$ refers to O or $H_2O$, $M_b$ comprises an element selected from the Periodic Table of the Elements IUPAC Groups 13, 3, 4, 5, 6, 8-10 (CAS Groups IIIA, IIIB, IVB, VB, VIB, or VIII) and n=0–4; and a rectangular grid characterized by the formula ($M_a$(Ligand')$_x$(Ligand")$_y$), wherein Ligand' and Ligand" are of different bond lengths, $M_a$ comprises an element selected from the Periodic Table of the Elements IUPAC Groups 11, 2, 12, 13, 14, 6, 7 or 8-10 (CAS Groups IB, IIA, IIB, IIIA, IVA, IVB, VIB, VIIB, or VIII), x=1 and y=1;

wherein the rectangular grid and pillar associate to form the metal-organic framework.

3. A method of fabricating a mixed ligand metal organic framework, the method comprising:

combining a hydrofluoric acid solution, a first metal source, a second metal source, and a solvent, sufficient to form a mixture;

reacting the mixture over a period of time sufficient to form a reacted mixture;

processing the reacted mixture to provide a metal organic framework via pillaring of rectangular grids with a pillar, wherein the pillar is characterized by the formula ($M_bF_{6-n}(O/H_2O)_n$), wherein $O/H_2O$ refers to O or $H_2O$, $M_b$ comprises an element selected from the Periodic Table of the Elements IUPAC Groups 13, 3, 4, 5, 6, 8-10 (CAS Groups IIA, IIIB, IVB, VB, VIB, or VIII) and n=0–4, and the rectangular grids are characterized by the formula ($M_a$(Ligand')$_x$(Ligand")$_y$), wherein $M_a$ comprises an element selected from the Periodic Table of the Elements IUPAC Groups 11, 2, 12, 13, 14, 6, 7 or 8-10 (CAS Groups IB, IIA, IIB, IIIA, IVA, IVB, VIB, VIIB, or VIII), x=1 and y=1, and Ligand' and Ligand" are of different bond lengths.

4. The ML-MOF as in claim 1, wherein n=1.

5. The ML-MOF as in claim 1, wherein $M_a$ is selected from the group consisting of $Cu^{2+}$, $Zn^{2+}$, $Co^{2+}$, $Ni^{2+}$, $Mn^{2+}$, $Zr^{2+}$, $Fe^{2+}$, $Ca^{2+}$, $Ba^{2+}$, $Pb^{2+}$, $Pt^{2+}$, $Pd^{2+}$, $Ru^{2+}$, $Rh^{2+}$, $Cd^{2+}$, $Mg^{2+}$, $Al^{3+}$, $Fe^{2+}$, $Fe^{3+}$, $Cr^{2+}$, $Cr^{3+}$, $Ru^{2+}$, $Ru^{3+}$ and $Co^{3+}$.

6. The ML-MOF as in claim 1, wherein $M_b$ is selected from the group consisting of $Al^{3+}$, $Fe^{2+}$, $Fe^{3+}$, $Cr^{2+}$, $Cr^{3+}$, $Ti^{3+}$, $V^{3+}$, $V^{5+}$, $Sc^{3+}$, $In^{3+}$, $Nb^{5+}$ and $Y^{3+}$.

7. The ML-MOF as in claim 1, wherein the solvent is selected from the group consisting of water, alcohols including ethanol (EtOH), dimethylformamide (DMF) and diethylformamide (DEF).

8. The ML-MOF as in claim 1, wherein the solvent comprises water and ethanol (EtOH).

9. The ML-MOF as in claim 1, wherein Ligand' and Ligand" are each a different organic, poly-functional, N-donor ligand.

10. The ML-MOF as in claim 1, wherein Ligand' and Ligand" are each a different bi-functional N-donor linker having aromatic or non-aromatic monocyclic or polycyclic groups.

11. The ML-MOF as in claim 1, wherein Ligand' and Ligand" are each a different polydentate, or poly-functional ligand including bi-functional ligands, tri-functional ligands, or ligands with four or more functional sites, wherein:

one or both of ligand' and ligand" comprise N-donor linkers;

one or both of ligand' and ligand" comprise different poly-functional ligands;

one or both of ligand' and ligand" comprise a plurality of N-donor functional groups;

one or both of ligand' and ligand" comprise an aromatic or non-aromatic nitrogen-containing monocyclic or polycyclic group structure; or ligand' and ligand" comprise two different aromatic or non-aromatic nitrogen-containing heterocyclic ligands.

12. The ML-MOF as in claim 1, wherein Ligand' and Ligand" are different and wherein one or both of Ligand' and Ligand" are or contain one or more nitrogen-containing heterocyclic groups selected from the group consisting of pyridine, pyrazine, pyrimidine, pyridazine, triazine, thiazole, oxazole, pyrrole, imidazole, pyrazole, triazole, oxadiazole, thiadiazole, quinoline, benzoxazole, benzimidazole, and tautomers thereof.

13. The ML-MOF as in claim 1, wherein Ligand' and Ligand" are different and wherein one or both of Ligand' and Ligand" are selected from the group consisting of: pyrazine, 4,4'-bipyridine, 4-[2-(pyridin-4-yl)ethynyl]pyridine, 4-[2-(pyridin-4-yl)ethenyl]pyridine, 4-[(1E)-2-(pyridin-4-yl)diazen-1-yl]pyridine, 4-[4-(pyridin-4-yl)phenyl]pyridine, 1,2-Bis(4-pyridyl)ethane, 1H-pyrazole-R-1H-pyrazole, 1H-imidazole-R 1H-imidazole, 1H-1,2,3,4-tetrazole-R-1H-1,2,3,4-tetrazole, 1H-1,2,4-triazole-R-1H-1,2,4-triazole, bis (pyridin-4-yl)-1,2,4,5-tetrazine, 4-(2-{4-[2-(pyridin-4-yl) ethynyl]phenyl}ethynyl)pyridine, 4-(2-{4-[2-(pyridin-4-yl) ethenyl]phenyl}ethenyl)pyridine, 4-(4-{2-[4-(pyridin-4-yl) phenyl]ethynyl}phenyl)pyridine, and 4-[4'-(pyridin-4-yl)-[1,1'-biphenyl]-4-yl]pyridine, wherein R is an aliphatic, aromatic or combination of aliphatic/aromatic bridge.

14. The ML-MOF as in claim 1, wherein Ligand' and Ligand" are different and wherein one or both of Ligand' and Ligand" have the general structure H(a)-A-L-B—H(b), wherein:

A and B can be the same or different groups containing donor atoms that bond to $M_a$, H(a) and H(b);

each of the H(a) and H(b) are the same or different heteroatoms selected from the group consisting of N and S; and L is a link between A and B that is one or more selected from the group consisting of: single, double or triple bonds; alkyl, alkenyl or alkynyl groups with 1-100 C atoms; aromatic or non-aromatic cyclic groups, including phenyl groups; diazene groups; tetrazine; a combination of one or more alkenyl groups and one or more phenyl groups; and a combination of one or more alkynyl groups and one or more phenyl groups.

15. The ML-MOF as in claim 14, wherein A and/or B are selected from the group consisting of pyridine, pyrazole, imidazole, tetrazole and triazole.

16. The ML-MOF as in claim 1, wherein Ligand' comprises pyrazine and Ligand" comprises 4,4-bipyridine.

17. A method of using the ML-MOF of claim 1 for capturing carbon dioxide from a fluid composition, comprising:

contacting the ML-MOF of claim 1 with a fluid composition including at least carbon dioxide; and capturing carbon dioxide from the fluid composition.

18. The ML-MOF as in claim 2, wherein Ligand' and Ligand" are different and wherein one or both of Ligand' and Ligand" have the general structure H(a)-A-L-B—H(b), wherein:

A and B can be the same or different groups containing donor atoms that bond to $M_a$, H(a) and H(b);

each of the H(a) and H(b) are the same or different heteroatoms selected from the group consisting of N and S; and L is a link between A and B that is one or more selected from the group consisting of: single, double or triple bonds; alkyl, alkenyl or alkynyl groups with 1-100 C atoms; aromatic or non-aromatic cyclic groups, including phenyl groups; diazene groups; tetrazine; a combination of one or more alkenyl groups and one or more phenyl groups; and a combination of one or more alkynyl groups and one or more phenyl groups.

19. The ML-MOF as in claim 18, wherein A and/or B are selected from the group consisting of pyridine, pyrazole, imidazole, tetrazole and triazole.

20. The ML-MOF as in claim 2, wherein Ligand' comprises pyrazine and Ligand" comprises 4,4-bipyridine.

\* \* \* \* \*